United States Patent Office 3,565,601
Patented Feb. 23, 1971

3,565,601
MIXED HERBICIDE COMPOSITIONS
Pierre Poignant, Lyon, France, assignor to Pechiney-Progil, Lyon, France, a corporation of France
No Drawing. Filed Mar. 14, 1968, Ser. No. 712,932
Claims priority, application France, Mar. 15, 1967, 48,411
Int. Cl. A01n 9/02, 9/24
U.S. Cl. 71—116                                         5 Claims

ABSTRACT OF THE DISCLOSURE

A herbicide composition consisting essentially of from 20 to 80 parts of 2,4-dinitro-6-tert.-butylphenol (dinoterbe), and from 80 to 20 parts of 2-methyl-4-chlorophenoxypropionic acid. The materials are utilized either in their free form, in the form of a metal salt, in the form of an ester, or in the form of a monoamine or polyamine salt.

---

This invention concerns novel herbicidal compositions containing 2,4-dinitro-6-tert.-butylphenol (or dinoterte) and 2-methyl-4-chlorophenoxypropionic acid (or mecoprop). For the purposes of this specification, these two products will now be referred to by the abbreviations DNTBP and MCPP, respectively.

DNTBP and MCPP are two herbicides that are used on a wide scale for eliminating weeds among cereal crops. The outstanding properties of DNTBP for the control of weeds among cereal crops in particular were described in French Pat. No. 1,475,686. The herbicidal activity of MCPP in turn has been described in numerous publications and in particular in the book by L. Detroux entitled Les Herbicides et Leur Emploi, pp. 133–134 (Editions J. Duculot S.A., Gembloux—2nd Edition 1965).

Unfortunately, each of them has a well-defined range of activity, and the systematic use of one or the other of these compounds generally leads to an unevenness in the flora, producing a proliferation of varieties that are unaffected by the product used. This phenomenon requires additional treatment by the farmer.

When considering a mixture of the materials, it becomes apparent that the use of a derivative of phenol with phytohormonal herbicide would be inadvisable from the outset in view of the essentially different mode of action of these two types of herbicide. The effectiveness of phytohormones is based both upon their penetration and upon their migration in the plant, while nitrated phenol compounds rapidly produce a change in the foliar parenchyma and as a result, make it difficult for the hormonal herbicide to penetrate.

French Pat. No. 931,451 describes herbicidal compositions containing a phenoxyacetic acid derivative and a nitrophenol, and the history of these compositions verifies the incompatibility. Large-scale tests conducted on the compositions have confirmed the ineffectiveness of the mixtures. In C. R. des Journess d'Etudes sur les Herbicides, Paris, Dec. 2, 3 1965, 3rd Conference du Columa, p. 195, it is stated that tests on mixtures of methyl-2-chloro-4-phenoxyacetic acid (MCPA) or dichloro-2,4-phenoxyacetic acid (2,4 D) with dinitro-2,4-sec. butyl-6-phenol (dinosebe) show a highly restricted selectivity of mixtures containing dinosebe on cereal crops before vertical growth. According to this publication, the products can only be used with extreme care.

It is a general object of this invention to provide improved herbicide compositions formed of mixtures with the compositions heaving properties exceeding the properties of the individual components of the mixtures.

It is a more specific object of this invention to provide herbicide compositions containing dinoterbe and mecoprop in proportions which provide extremely effective results with the compositions being free of adverse properties normally recognized to exist in mixtures having similar chemical characteristics.

These and other objects of this invention will appear hereinafter, and it will be understood that the examples hereinafter provided are for purposes of illustration and are not to be considered as limiting the scope of the invention.

The composition of this invention generally comprises a herbicidal product containing from 20 to 80 parts DNTBP and from 80 to 20 parts MCPP. The active materials are included in the composition either in their free form or in the form of a metal salt, an ester, or a monoamine or polyamine salt.

Based on the prior art teachings discussed above, it would be normal to assume that greater amounts of MCPP and DNTBP would be required to achieve a given herbicidal activity where these ingredients were used in a mixture rather than alone. It would also be assumed that the use of the ingredients together would result in phytotoxicity in a cereal crop.

It has now been found that with the particular ingredients employed and with the stated proportions, there is no weakening of activity. To the contrary, there is a synergistic result which enables the described mixture to be used in amounts significantly lower than those which would be necessary if each of the constituents were used alone.

This synergy is demonstrated by the following:

EXAMPLE 1

Small plots of land 10 square meters in size and overrun with weeds were treated respectively with each of the constituents and then with mixtures thereof. 15 days after treatment, a check was made of the percentage destruction of the weeds present which in this test were essentially: cornflower (*Centaurea cyanus*), red poppy (*Papaver rhoeas*), speedwell (*Veronica sp.*), chickweed (*Stellaria media*), corn thistle (*Cirsium arvense*), and sorrel (*Rumex sp.*).

Treatment was carried out after emergence on weeds with from 5 to 20 leaves, depending upon the varieties. Each test was repeated three times and each of the products was used in two forms.

In a first run, DNTBP and MCPP were in the form of their ammonium salts and in a second run in the form of their 1,3-propylene oleyldiamine salts.

The figures set out in the following table correspond to the average of the results from these different tests:

| Product used and dosage | Percentage destruction | | | | | |
|---|---|---|---|---|---|---|
| | Red poppy | Cornflower | Speedwell | Chickweed | Thistle | Sorrel |
| DNTBP, 0.5 kg./ha | 80 | 73 | 85 | 60 | 10 | 10 |
| MCPP, 0.5 kg./ha | 0 | 10 | 0 | 0 | 10 | 25 |
| DNTBP, 0.5 kg./ha. plus MCPP, 0.5 kg./ha | 95 | 98 | 98 | 92 | 70 | 82 |
| DNTBP, 0.65 kg./ha. plus MCPP, 0.35 kg./ha | 100 | 96 | 100 | 96 | 69 | 70 |

These tests show quite clearly that the combined action of the two constituents is much stronger than their elementary action, as might be assumed. In every case, the activity of the mixtures is very largely greater than the total activities of the components.

This synergy is evident with ratios of each of the constituents varying from 20 to 80 parts by weight of one to 80 to 20 parts by weight of the other, the best results having been obtained with compositions containing from 35 to 65 parts of DNTBP for 65 to 35 parts of MCPP.

The doses of active material to be used will obviously be governed by the problem to be resolved and essentially by the state of the weeds during treatment and by the type of cereal crops.

A dose of from 0.8 to 1.7 kg./ha. (in active material) of the mixture will generally be sufficient for spring cereals, while larger doses of from 1.2 to 2.4 kg./ha. will be required for the treatment of winter cereals.

The compositions according to the invention have a certain number of major advantages over conventional compositions so far as the user is cncerned.

As explained in the brochure "Conseils Practiques pour l'Emploi des Herbicides dans les Cereales" published by l'Institute Technique des Cereales et des Fourrages, pp. 10 and 11, the mixtures of nitrated phenol with phyto-hormonal herbicides (and in particular dinosebe and 2,4-D or MCPA) that are currently available, are in fact only compensating formulations that should only be used in cases where herbicidal treatment with nitrated phenols has not been completed in time. They are only recommended for use during a short period in the vegetative cycle of the cereals between the end of tillering and the start of shooting.

In addition, the presence of dinosebe causes fairly serious blight in the foliage of the cereals and makes it impossible to use large doses of the kind that are occasionally necessary for destroying weeds, such as wild camomile, (*Matricaria sp.*) that have already reached an advanced stage of development.

The presence of dinosebe also prevents treatment from being carried out if the temperature is lower than 15° and therefore seriously restricts the use of mixtures such as these on winter cereals.

The compositions according to the invention have significant advantages since:

(a) A single treatment with them is sufficient to destroy both perennial and annual dicotyledons, thus avoiding the proliferation of one or the other of these species.

(b) They have a particularly broad range of activity so that they can destroy or effectively limit varieties that are unaffected or largely unaffected by the constituents on their own. Bifora (*Bifora radians*), mouse-ear (*Cerastium arvense*), corn thistle (*Cirsium arvense*), spear thistle (*Cirsium lanceolatum*), bearbine (*Convolvulus arvensis*), myosotis (*Myosotis arvensis*), sorrels (*Rumex sp.*), for example, are effectively controlled by the compositions according to the invention although they have a moderate to total resistance to DNTBP and to MCPP when each is used alone.

(c) They may be used for a long period in the vegetative cycle of the cereals, extending from the beginning of tillering to the beginning of shooting.

(d) In view of the fact that they are largely unaffected by climatic conditions, they may be used with equal effect on winter cereals and on spring cereals.

(e) They have an extremely large safety margin enabling them to be used in doses very much larger than the practical dose without any risk of reductions in yield or of causing blight in the cereal.

The compositions according to the invention may be formulated by the methods normally used for this type of application.

DNTBP and MCPP may be used in their free form (phenol or acid), although it is generally preferred to use them in the form of esters, alkaline or ammonium salts or in the form of mixtures of these salts.

Suitable amines include alkylamines (ethylamine, triethyl amine, tributylamine and so on), cycloalkylamines, alkanolamines, hydroxyethylene amines or N-alkyltrimethylene diamines corresponding to the general formula $$R\ NH—(CH_2)_3—NH_1$$

in which R represents a long-chain alkyl group of the kind found in fatty materials such as copra, soya, olein, tallow and so on.

These various salts or esters thus formed all have comparable herbicidal properties, but distinctly different physico-chemical properties (melting point, vapor pressure, solubility and so on) with the result that they will be selected depending upon the type of formulation to be prepared and upon the conditions of use. For example, a wettable powder or paste may be prepared by using the alkaline salts of the two constituents. In addition to the active materials, this wettable powder may contain additives and fillers normally used, such as, wetting agents, deflocculants, antiagglomerants and so on.

It is also possible to use liquid formulations which contain, in addition to the active materials, organic solvents (methanol, ethanol, glycols, aromatic and paraffin hydrocarbons, DMSO), inorganic solvents (water) or a mixture or emulsion of water and one or more of the above-mentioned organic solvents. Wetting agents, surfactants and so on may also be added.

EXAMPLE 2

A liquid formulation containing 200 g./l of DNTBP and 200 g./l. of MCPP is prepared by mixing 209 g. of diethanolamine and 410 g. of methanol and gradually adding to the resulting mixture with thorough stirring 204 g. of 98 percent MCPP acid and 228 g. of 87 percent DNTBP (in phenolic form).

The temperature rises very slightly and salt formation takes place without any difficulty.

A formulation such as this is remarkably stable at low temperatures (down to −10° C.) which is obviously extremely important so far as products that are normally used during the cold months of the year are concerned.

It will be understood that various changes may be made in the details of the formulations, and in the method described without departing from the spirit of the invention, especially as defined in the following claims.

That which is claimed is:

1. A herbicidal composition consisting essentially of from 20 to 80 parts by weight of 2,4-dinitro-6-tert.-butylphenol and from 80 to 20 parts by weight of 2-methyl-4-chlorophenoxy-propionic acid.

2. A composition in accordance with claim 1 wherein the materials in said composition are present in their free form.

3. A composition in accordance with claim 1 wherein the materials in said composition are in the form of a compound selected from the group consisting of a metal salt, an ester, a monoamine salt, and a polyamine salt.

4. A composition in accordance with claim 1 wherein said 2,4-dinitro-6-tert.-butylphenol comprises from 35 to 65 parts by weight of the composition and said 2-methyl-4-chlorophenoxypropionic acid comprises from 65 to 35 parts by weight of said composition.

5. A method for the treatment of weeds comprising applying the composition of claim 1 in herbicidally effective amounts to said weeds in doses of from 0.8 to 2.4 kg./ha.

References Cited

UNITED STATES PATENTS

| | | | |
|---|---|---|---|
| 3,231,362 | 1/1966 | Pfeiffer | 71—116 |
| 2,630,380 | 3/1953 | Hanson et al. | 71—122 |
| 2,802,883 | 8/1957 | Dietzler | 260 |

(Other references on following page)

FOREIGN PATENTS 931,451 1948 France.
1,475,686 1965 France.

OTHER REFERENCES

Poignant et al., Fr. Pat. 1, 326, 413. May 10, 1963.
Chem. Abstracts, Vol. 59 (1963) 14510c.
Detroux, "Les Herbicides et Leurs Emploi," pp. 133–134, 2nd Edition, 1965.

Detroux, "Les Herbicides et Leurs Emploi" (p. 127 particularly relied on) pp. 119–127, 1959.

LEWIS GOTTS, Primary Examiner

C. L. MILLS, Assistant Examiner

U.S. Cl. X.R.

71—122

UNITED STATES PATENT OFFICE
CERTIFICATE OF CORRECTION

Patent No. 3,565,601                Dated February 23, 197

Pierre Poignant

It is certified that error appears in the above identified patent and that said Letters Patent are hereby corrected as shown below:

Column 4, line 7, the formula should read as follows $$R\ NH - (CH_2)_3 - NH_2$$

Signed and sealed this 22nd day of June 1971.

(SEAL)
Attest:

EDWARD M. FLETCHER, JR.           WILLIAM E. SCHUYLER, JR.
Attesting Officer                  Commissioner of Patents